(12) United States Patent
Calleja

(10) Patent No.: US 7,150,361 B2
(45) Date of Patent: Dec. 19, 2006

(54) M-DIVIDER MATERIAL-BAY RESTRAINING CABLE SYSTEM

(76) Inventor: Michael J. Calleja, 110 San Benito Rd., Brisbane, CA (US) 94005

( * ) Notice: Subject to any disclaimer, the term of this patent is extended or adjusted under 35 U.S.C. 154(b) by 229 days.

(21) Appl. No.: 10/797,265

(22) Filed: Mar. 10, 2004

(65) Prior Publication Data

US 2005/0199569 A1    Sep. 15, 2005

(51) Int. Cl.
A47F 5/00    (2006.01)
A47F 7/00    (2006.01)

(52) U.S. Cl. .................... 211/49.1; 211/41.15; 211/175; 211/183; 248/499; 182/112

(58) Field of Classification Search ............... 211/59.4, 211/60.1, 184, 49.1, 189, 183, 119.17, 175, 211/4, 41.15; 182/113; 248/499
See application file for complete search history.

(56) References Cited

U.S. PATENT DOCUMENTS

| | | | |
|---|---|---|---|
| 297,485 A * | 4/1884 | Aycock ...................... 34/143 |
| 1,015,926 A * | 1/1912 | Anderson .................. 211/49.1 |
| 2,043,841 A * | 6/1936 | Stevens ..................... 211/60.1 |
| 2,070,507 A * | 2/1937 | Bishop ........................ 312/290 |
| 2,539,809 A * | 1/1951 | Buckley .................... 211/59.4 |
| 3,165,318 A * | 1/1965 | Lissandrello ................. 273/272 |
| 3,175,694 A * | 3/1965 | Reibold et al. ............. 211/60.1 |
| 3,227,503 A * | 1/1966 | Fletcher et al. .............. 312/234 |
| 3,385,451 A * | 5/1968 | Anderson .................. 211/60.1 |
| 3,861,704 A * | 1/1975 | De Witte ................... 280/79.3 |
| 3,963,290 A * | 6/1976 | Rennemann ................ 312/321 |
| 4,159,831 A * | 7/1979 | Schorr ........................ 280/79.3 |
| 4,416,463 A * | 11/1983 | Marsh et al. ............... 280/79.3 |
| D296,503 S * | 7/1988 | Bell et al. ..................... D6/462 |
| 4,981,225 A * | 1/1991 | Cole ........................... 211/183 |
| 5,111,943 A * | 5/1992 | Ramey ...................... 211/59.4 |
| 5,170,829 A * | 12/1992 | Duncan et al. ........... 160/84.02 |
| 5,234,113 A * | 8/1993 | Ramey ...................... 211/59.4 |
| 5,297,685 A * | 3/1994 | Ramey ...................... 211/59.4 |
| 5,346,076 A * | 9/1994 | Hart ........................ 211/86.01 |
| 5,573,125 A * | 11/1996 | Denny ........................ 211/183 |
| 5,573,227 A * | 11/1996 | Hemauer et al. ........ 256/65.06 |
| 5,624,045 A | 4/1997 | Highsmith |
| D383,335 S * | 9/1997 | Shanahan et al. ............ D6/468 |
| D392,820 S * | 3/1998 | Shanahan et al. ............ D6/468 |
| 5,743,413 A * | 4/1998 | Noll ........................... 211/60.1 |
| 5,984,121 A * | 11/1999 | Cole ........................... 211/183 |
| 6,332,549 B1 * | 12/2001 | MacDonald ................. 211/183 |
| 6,585,122 B1 * | 7/2003 | Calleja ........................ 211/183 |
| 6,609,621 B1 * | 8/2003 | Denny et al. ............... 211/189 |
| 6,619,490 B1 * | 9/2003 | Calleja ........................ 211/183 |
| 6,672,546 B1 | 1/2004 | Calleja |
| 6,722,512 B1 * | 4/2004 | Scully ......................... 211/183 |
| 6,913,151 B1 * | 7/2005 | Stevenson ................... 209/630 |
| 6,935,514 B1 * | 8/2005 | Lackey et al. ............. 211/60.1 |
| 2002/0153340 A1 * | 10/2002 | Denny et al. ............... 211/189 |
| 2005/0103736 A1 * | 5/2005 | Calleja ........................ 211/189 |

* cited by examiner

Primary Examiner—Richard E. Chilcot, Jr.
Assistant Examiner—Jared W. Newton
(74) Attorney, Agent, or Firm—Robert Charles Hill

(57) ABSTRACT

A restraining cable and rack system comprises material-bay dividers with cable restraints that can be laced-through, end-attached, and adjusted to a variety of heights on vertical bars. Long sticks or sheets of material are stood on-end inside the bays for retail display. The restraining cables are positioned to prevent the retail material from falling out of the bays.

7 Claims, 4 Drawing Sheets

M-DIVIDER MATERIAL-BAY RESTRAINING CABLE SYSTEM

BACKGROUND OF THE INVENTION

1. Field of the Invention

The present invention relates to material-rack safety systems, and more particularly to easy-to-disconnect restraining cables that restrain vertical stands of board and stick materials in divided display racks.

2. Description of Related Art

A typical warehouse retail store, e.g., The Home Depot, has divided racks for displaying wood moldings, corrugated roofing, and dimensional lumber. The material is stood on-end, and tilted-in to stay put. But very little keeps the long pieces in place in their divided racks. Not stacking the material right, bumping it, or an earthquake could result in a lot of heavy, dangerous material raining down on customers and workers.

So a number of devices have been developed in the prior art to keep such material in their divided racks. Those devices that are too difficult to be installed, don't get installed. Those that are too difficult to secure, don't get secured. And those mechanisms that are too difficult to disconnect or open can impede sales, or make the customer seek store-employee help. All of these things can work against the retail sales concept of self-help customers in warehouse stores.

A latched beam-to-column storage rack connector is described by Charles Highsmith, et al., in U.S. Pat. No. 5,624,045, issued Apr. 29, 1997. Here an improved hook-and-peg arrangement is disclosed. The problem of bumping the retaining bar up and unlatching it inadvertently was recognized. The configuration described supposedly overcomes such troubles.

A warehouse material-bay restraining cable system is described by the present inventor, Michael J. Calleja, in U.S. Pat. No. 6,672,546, issued Jan. 6, 2004. Such describes restraining cables that are attached at fixed points to bay dividers. It would be advantageous for the users to be able to freely and easily adjust the height of the restraining cables.

SUMMARY OF THE INVENTION

Briefly, a restraining cable and rack system embodiment of the present invention comprises tubular material-bay dividers with wire-rope restraining cable gates and easy-to-release cable clips that can be adjusted to various heights in the bays. Long sticks or sheets of material are stood on-end inside the bays for retail display. The cable clips are mounted on the front edges of the tubular material-bay dividers and the wire-rope restraining cable gates are secured to prevent the retail material from falling out onto the aisleways. A sliding lock on the cable clips has an enlarged hole that can be aligned to allow a beaded end of the wire-rope restraining cable gates to be secured or released. Such sliding lock is loosely attached, and will fall into a cable-locked position when not held up.

An advantage of the present invention is that a safety restraint is provided that is easy and simple to use.

A further advantage of the present invention is that a material display bay safety restraint is provided that is easy and simple to adjust.

Another advantage of the present invention is that a restraining cable and rack system is provided for retail home-improvement warehouse use.

A further advantage of the present invention is that a restraining cable system is provided that cannot be bumped or jarred into releasing the restraint gates.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1:
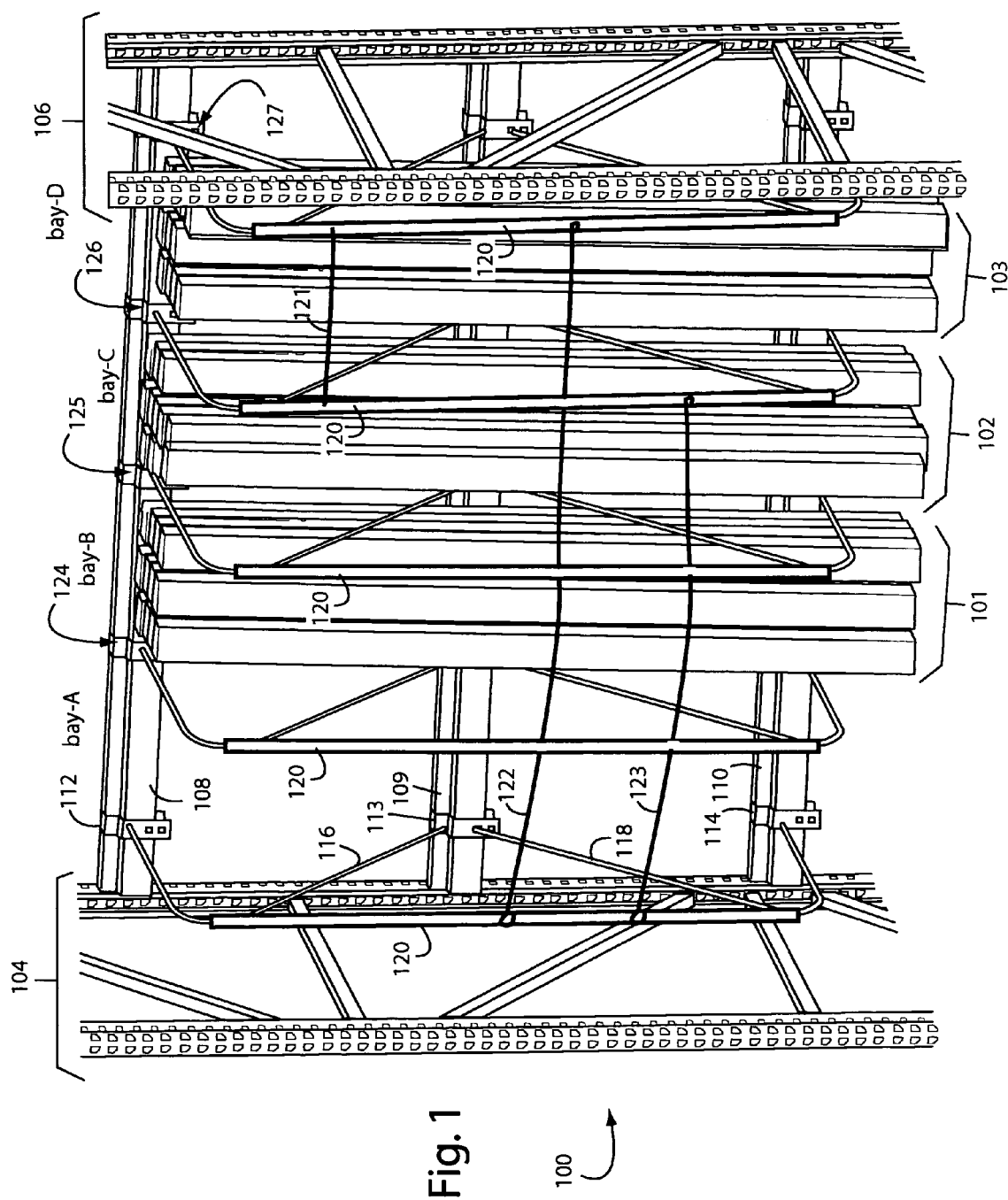
FIG. 1 is a perspective view of a restraining cable and rack system embodiment of the present invention.

FIG. 1 illustrates a restraining cable and rack system embodiment of the present invention, referred to herein by the reference numeral 100. The implementation shown here has four bays for vertically standing long boards or material sheets in retail displays in home-improvement warehouse stores, etc. For example, dimensional 2-by-4 lumber studs 101–103. Any number of bays can be used.

The restraining cable and rack system 100 comprises side frames 104 and 106 between which are hung lateral beams 108–110. Beams anchors 112–114 are laterally adjusted and bolted down to fix the widths of each bay formed by adjacent dividers. A pair of dividers 116 and 118 form an "M" and are bridged at their respective frontal lobes by a vertical cable adjustment bar 120. Such dividers 116 and 118 can be made of tubular aluminum, or other similar bars and pipes of structural materials. This is typical for all five such dividers shown in FIG. 1 that make the four bays shown. One or more restraining cables 122 and 123 can be attached at a variety of heights on the vertical cable adjustment bar 120. Such cables can be wire-rope, such as braided stainless steel, or may be of strong plastic like nylon. The cables 121–123 shown in FIG. 1 bridge the bays and attach to respective vertical cable adjustment bars 120. However, shorter cables can be used instead to bridge across fewer such bays, e.g., cable 121.

The second through fifth M-divider assemblies are numbered 124–127 in FIG. 1. These form four bays A–D.

Figure 2:
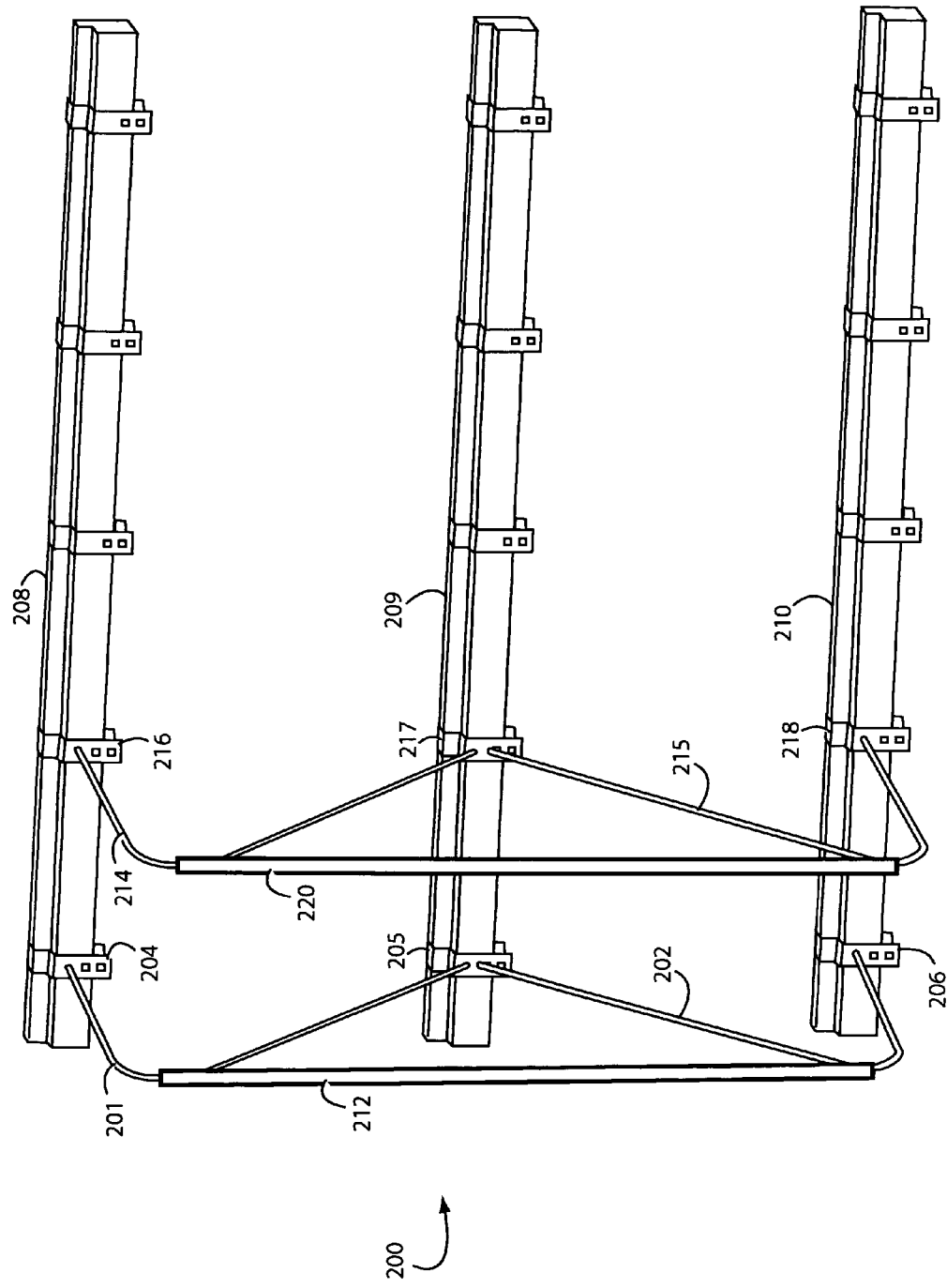
FIG. 2 is a perspective view of the material bay dividers and cable-height adjustment bars used in the system of FIG. 1.

FIG. 2 represents a material display divider system 200 with M-dividers and cable-height adjustment bars as used in the system of FIG. 1. A complete "M-divider" includes an upper divider 201 and a lower divider 202 which are attached to beam anchors 204–206. These are respectively clamped onto lateral beams 208–210. A vertical bar 212 bridges the frontal lobes of the dividers 201 and 202. Such has a number of slots and holes in which a restraint cable can be threaded or connected. For example, as shown in FIGS. 4–5.

Similarly, a second M-divider comprises an upper divider 214 and a lower divider 215 which are attached to beam anchors 216–218. These are also respectively clamped onto lateral beams 208–210. A second vertical bar 220 bridges the frontal lobes of the dividers 214 and 215.

Figure 3:
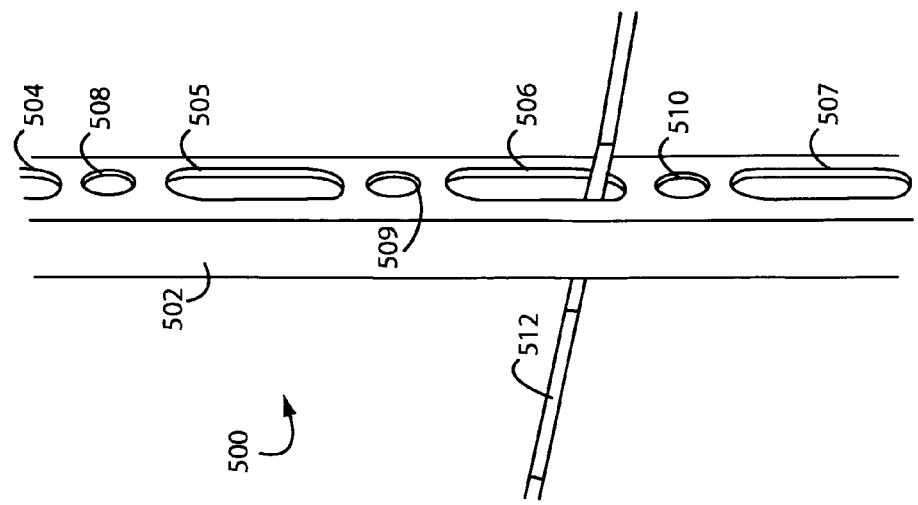
FIG. 3 is a perspective view detailing a vertical cable adjustment bar and its attachment to a lobe of an upper part of a material bay divider, as used in FIGS. 1 and 2.

FIG. 3 details a vertical cable restraint anchor bar 300, as used in FIGS. 1–2. The vertical cable restraint anchor bar 300 includes a flat metal body 302 folded into a U-channel to capture the tubing of an M-divider 304. A carriage bolt 306 and machine nut 308, or other type of fastener, is used to secure and fasten the assembly. The body 302 is punched or drilled with slots 310–311 and holes 312–313. If carriage bolts are to be used, such holes can be square, as shown in the drawings. The intended use of such slots and holes is more apparent in FIG. 4.

Figure 4:
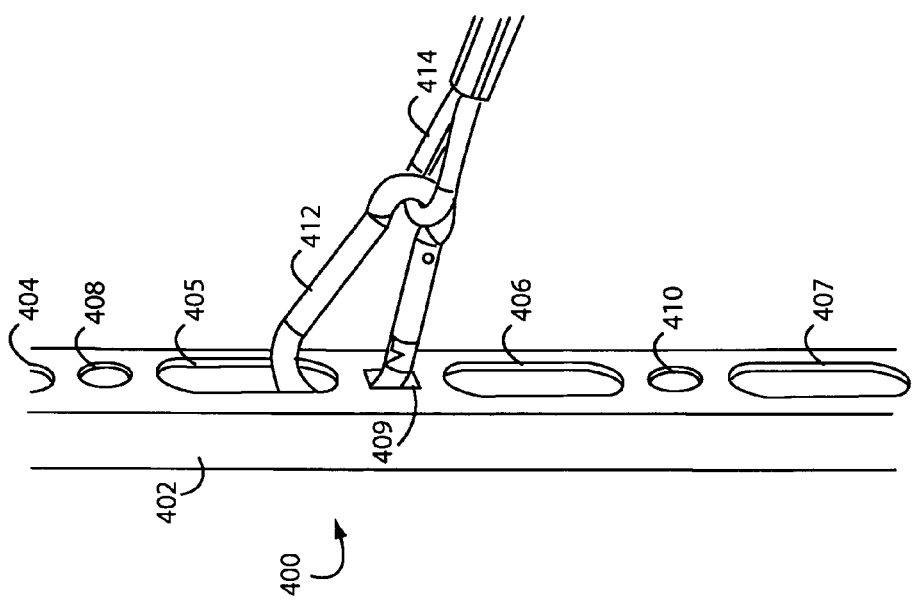
FIG. 4 is a perspective view detailing the snap hook attachment of a restraining cable to a cable-height adjustment bar, as used in FIGS. 1–3.
Figure 5:
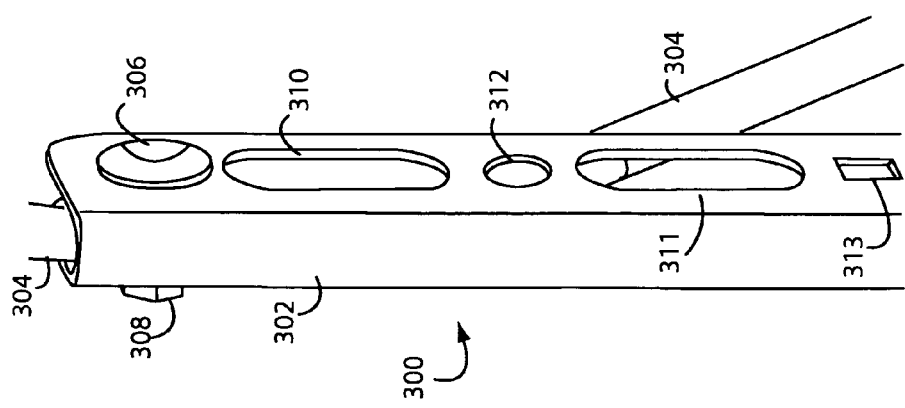
FIG. 5 details a vertical cable restraint anchor bar, as used in FIGS. 1–3, for the intermediate dividers.

FIG. 4 details a vertical cable restraint anchor bar 400, as used in FIGS. 1–3 at each side end. The vertical cable restraint anchor bar 300 includes a structural body 402 that is punched or drilled with slots 404–407 and holes 408–410. These allow a snap-hook 412 attached to the end of a restraining cable 414 to be attached by a user at a variety of vertical positions or heights.

FIG. 5 details a vertical cable restraint anchor bar 500, as used in FIGS. 1–3 for the intermediate dividers. The vertical cable restraint anchor bar 500 includes a structural body 502 that is punched or drilled with slots 504–507 and holes 508–510. These allow a snap hook 412 and a restraining cable 512 to be passed through by a user at a variety of vertical positions or heights. For example, a slot 1.5" by three-eights to one inch wide has proven useful.

Figure 6:
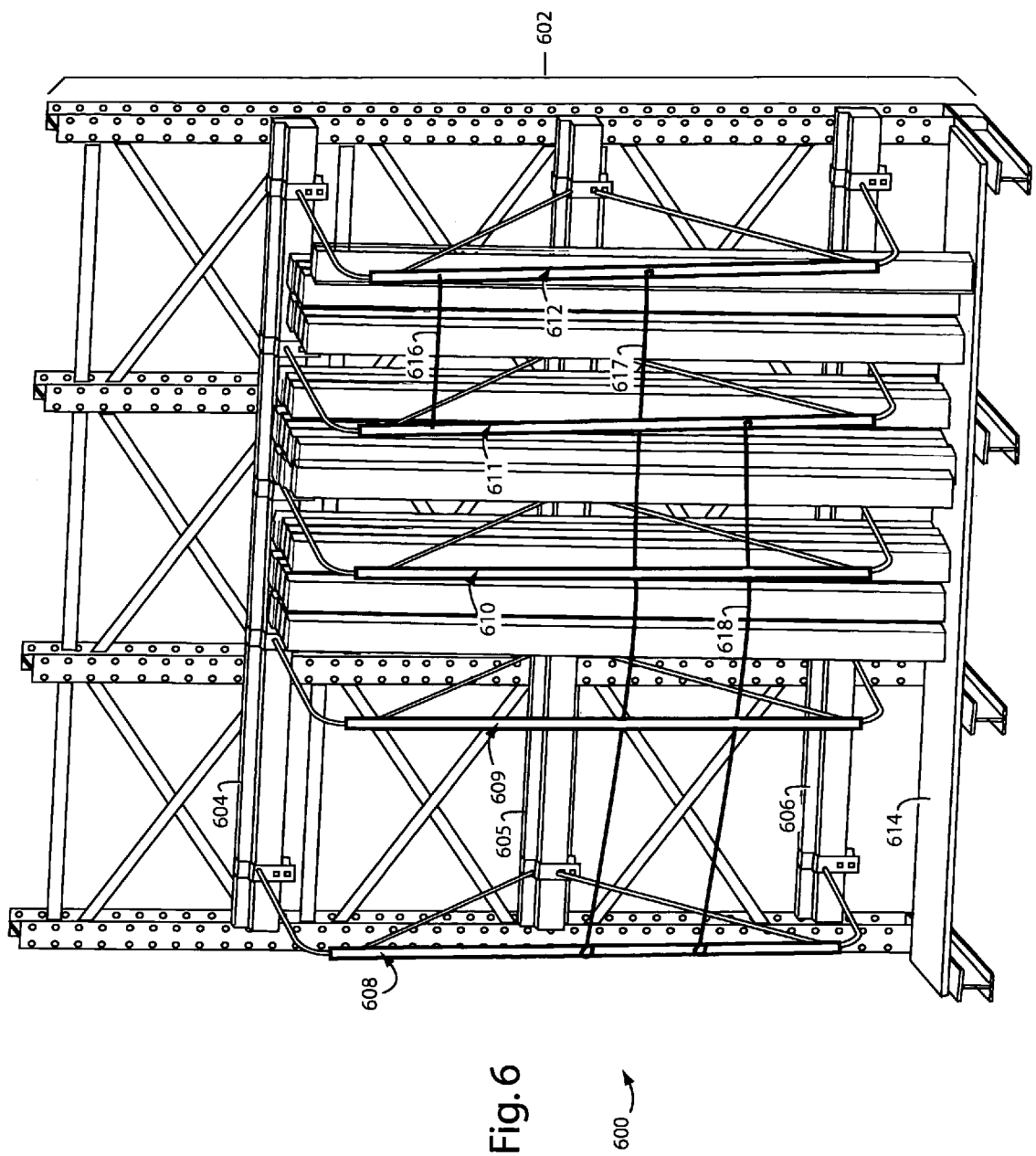
FIG. 6 is a perspective view of a material-storage system that is an alternative embodiment of the present invention.

FIG. 6 represents a material-storage system 600 that is an alternative style to that shown in FIG. 1. Here, a cantilever backing frame 602 is fitted with lateral beams 604–606. This allows a set of M-dividers 608–612 to be attached and adjusted to suit the material being displayed. Here, four bays are formed by the five M-divider 608–612. The material on display rests on a floor plank 614. Different restraint cables 616–618 are laced and attached at corresponding strategic points along the vertical bars at the front of each M-divider 608–612.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A restraining cable and rack system, comprising:
   a continuous rod forming a material-bay divider having an "M" shape, said divider in combination with a rack system for mounting to a backing brace or wall and providing for lateral containment of a vertical stand of materials in said rack system;
   wherein said rack system comprises a plurality of horizontally disposed lateral beams extending between a plurality of vertical uprights, thereby defining a bay for storing a vertical stand of materials;
   beam anchors in the form of brackets disposed at the ends of the "M" shaped divider, wherein said anchors are adapted to attach said divider to the lateral beams of the rack;
   said divider further comprising at least two frontal lobes defining the forward most portion of the divider;
   a vertical bar attached to said frontal lobes of the material-bay divider;
   a sequence of slots and holes defining a series of anchor points disposed along the vertical bar, wherein said anchor points provide for a variety of restraining cable height adjustments to control spillage of said vertical stand of materials; and
   a restraining cable having an attachment means, said cable spanning a bay within said rack, wherein said cable is adapted to pass through said slots for attachment to the series of anchor points.

2. The system of claim 1, wherein:
   the means for attaching includes a snap hook.

3. The system of claim 1 wherein: the sequence of slots and holes in the series of anchor points allows for said attachment device and said restraining cable to be passed through intermediate bays in said rack.

4. The system of claim 1, wherein:
   the vertical bar comprises flat metal formed into a U-channel to fit the material-bay divider.

5. The system of claim 1, wherein:
   the vertical bar comprises flat metal punched or drilled with the series of anchor points.

6. The system of claim 1, wherein:
   the rack system has a plurality of bays, and
   the restraining cable spans more than one bay.

7. A restraining cable and rack system, comprising:
   at least two material-bay dividers formed of a continuous rod having an "M" shape, said dividers in combination with a rack system for mounting to a backing brace or wall and providing for lateral containment of a vertical stand of materials in said rack system;
   wherein said rack system comprises a plurality of horizontally disposed lateral beams extending between a plurality of vertical uprights, thereby defining a bay for storing a vertical stand of materials;
   beam anchors in the form of brackets disposed at the ends of each "M" shaped divider, wherein said anchors are adapted to attach said dividers to the lateral beams of the rack;
   said dividers further comprising at least two frontal lobes defining the forward most portions of the dividers;
   a vertical bar attached to said frontal lobes of each respective ones of the material-bay dividers;
   a sequence of slots and holes defining a series of anchor points disposed along each respective ones of the vertical bars, wherein said anchor points provide for lacing, attachment, and a variety of restraining cable height adjustments; and
   a restraining cable spanning a bay within said rack, wherein said cable is adapted to pass through said slots for lacing and attachment to the series of anchor points of any two of the vertical bars of each respective ones of the material-bay dividers, wherein by spanning said bays, said cable provides for spillage control of said vertical stand of materials during use.

* * * * *